(No Model.)
W. L. CLARK
JOURNAL BEARING.
No. 256,463.  Patented Apr. 18, 1882.
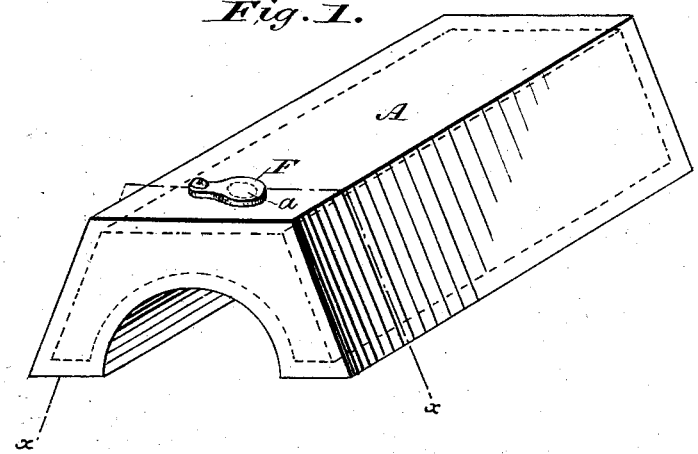
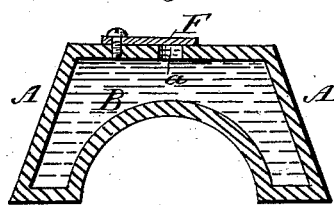
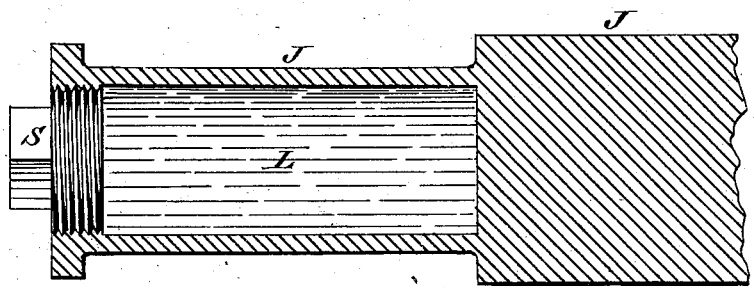
WITNESSES
INVENTOR
William Leach Clark
By T. E. Brecht
his Attorney.

UNITED STATES PATENT OFFICE.

WILLIAM L. CLARK, OF WEBSTER CITY, IOWA.

JOURNAL-BEARING.

SPECIFICATION forming part of Letters Patent No. 256,463, dated April 18, 1882.

Application filed January 27, 1882. (No model.)

*To all whom it may concern:*

Be it known that I, WILLIAM LEACH CLARK, residing at Webster City, in the county of Hamilton and State of Iowa, have invented a new and useful Improvement in Journal-Bearings, of which the following is a specification.

My invention relates to improvements in journal boxes and bearings; and the object is to construct them in such manner that they will not become overheated by friction or from other causes, and by my device are made anti-heating.

The invention consists in making the journal-boxes, or what are usually called "brasses," as well as the journals themselves, especially for railroad-cars, hollow instead of solid, as has been done heretofore, and in filling the cavity with a liquid of any kind—water, oils, &c.—and after being filled to hermetically close or seal the filling-opening, so that there can be no contact with the atmosphere, all of which will be more fully described hereinafter, reference being had to the accompanying drawings, in which—

Figure 1 represents a perspective view of a journal-box for a railroad-axle. Fig. 2 is a cross-section on line *x x* of Fig. 1. Fig. 3 is a longitudinal section of a hollow journal filled with a liquid.

In the drawings, A represents the shell of a journal-box, made of any suitable metal and shape, and made hollow, and into it the water, oil, or other liquid, B, is poured through an opening, *a*, until the entire cavity is filled and no space is left for air, so that the liquid cannot evaporate or escape. The opening is firmly closed by a pivoted cover, F, or a screw-plug or similar device. In Fig. 3 the journal J itself is made hollow, instead of the journal-box, and the cavity is filled with a suitable liquid, L. The end of this journal is then firmly sealed or closed by screw-plug S, so that the air is entirely excluded from the interior. It will be thus seen that in either case—viz., the hollow box or the hollow journal being filled with liquid, which serves as a non-conductor and equalizer—the heat caused by friction between the journal and the box or bearing will be always kept as low as the boiling-point of the liquid contained in the hollow space or cavity, and thus the excessive heating of the box or journal is entirely prevented.

Although I have described and shown the boxes and journals as adapted to railroad-cars, yet it will be readily understood that they can be used on any journal bearings or boxes, as well as journals of any shafting or axles.

By excluding the air the liquids cannot boil, as they will not evaporate.

I am aware that journal boxes or bearings made solid have been placed in a hollow boxing or housing, through which a continuous stream of water is allowed to circulate; but this does not prevent the journal-box itself from heating, and the water would be generated into steam at the upper surface, and would finally prevent access of water to the housing, and thus become worthless. I am also aware that a solid journal-box has been placed in a hollow boxing or housing in which the liquid is contained and comes in contact with the sides of the journal-box, but not with the top, nor with the cavity into which the journal fits, and thus the very object of bringing the liquid in contact with the bearing-surfaces is prevented and the heating of the journal-box is not obviated. I am also aware that hollow journal-boxes have been used with a continuous circulation of water for keeping them cool. I therefore disclaim these constructions, as they could not be applied to railroad-cars, nor elevated shafting, nor such journals where there is no ready means or supply for a continuous flow of water; but,

Having thus described my invention, what I claim, and desire to secure by Letters Patent, is—

A hollow journal-box or journal filled with liquid and firmly closed, substantially as and for the purpose described.

WILLIAM LEACH CLARK.

Witnesses:
 WILL. F. SMITH,
 E. A. PETTIBONE.